(12) United States Patent
Smith

(10) Patent No.: US 9,358,928 B2
(45) Date of Patent: Jun. 7, 2016

(54) FORWARD AND REARWARD VIEWING MIRROR DEVICE

(71) Applicant: Kevin Anthony Smith, Cincinnati, OH (US)

(72) Inventor: Kevin Anthony Smith, Cincinnati, OH (US)

( * ) Notice: Subject to any disclaimer, the term of this patent is extended or adjusted under 35 U.S.C. 154(b) by 69 days.

(21) Appl. No.: 14/279,295

(22) Filed: May 15, 2014

(65) Prior Publication Data

US 2015/0329051 A1    Nov. 19, 2015

(51) Int. Cl.
*B60R 1/06* (2006.01)
*B60R 1/08* (2006.01)
*B60R 1/10* (2006.01)

(52) U.S. Cl.
CPC ... *B60R 1/08* (2013.01); *B60R 1/06* (2013.01); *B60R 1/10* (2013.01)

(58) Field of Classification Search
CPC .......... B60R 1/00; B60R 1/002; B60R 1/006; B60R 1/007; B60R 1/02; B60R 1/06; B60R 1/08; B60R 1/081; B60R 1/10; B60R 1/015
USPC .......................................... 359/838, 871–883
See application file for complete search history.

(56) References Cited

U.S. PATENT DOCUMENTS

| | | |
|---|---|---|
| 1,666,236 A | 4/1928 | Fuerth |
| 1,870,468 A | 8/1932 | Ross |
| 1,883,296 A | 10/1932 | Johnson |
| 2,132,026 A | 10/1938 | Griffith |
| 2,137,440 A | 11/1938 | Boeve |
| 2,250,896 A | 7/1941 | Stokesbary |
| 2,302,952 A | 11/1942 | Pfeifer |
| 2,534,135 A | 12/1950 | Lahr et al. |
| 2,622,482 A | 12/1952 | Balkin |
| 2,796,003 A | 6/1957 | Kaufman |
| 4,268,120 A | 5/1981 | Jitsumori |
| 4,325,609 A | 4/1982 | Alford |
| D276,223 S | 11/1984 | Kallmyer |
| 4,685,779 A | 8/1987 | González |
| 5,237,459 A | 8/1993 | Strauss |
| 5,594,594 A * | 1/1997 | Ung .................. B60R 1/082 359/833 |
| 5,644,443 A | 7/1997 | Hung |
| 6,059,418 A | 5/2000 | Edwards |
| 6,104,552 A | 8/2000 | Thau et al. |
| 6,247,821 B1 * | 6/2001 | Brewster ............ B60R 1/10 359/841 |
| 6,250,766 B1 | 6/2001 | Strumolo et al. |
| 6,715,894 B1 | 4/2004 | Taylor |
| 2006/0132943 A1 * | 6/2006 | Suzuki ................ B60R 1/10 359/879 |
| 2010/0208373 A1 * | 8/2010 | Corum ............... B60R 1/10 359/863 |
| 2011/0013301 A1 * | 1/2011 | Uematsu ............ B60R 1/06 359/850 |

* cited by examiner

*Primary Examiner* — Kimberly N Kakalec

(57) ABSTRACT

A mirror device permitting a driver using the device to view forward and rearward of the vehicle. The device provides the visual field of the conventional and/or modern side-view mirror and also extends the visual field to view areas, regions, and/or objects which are forward to allow a line of sight that might otherwise be blocked by an obstruction.

1 Claim, 4 Drawing Sheets

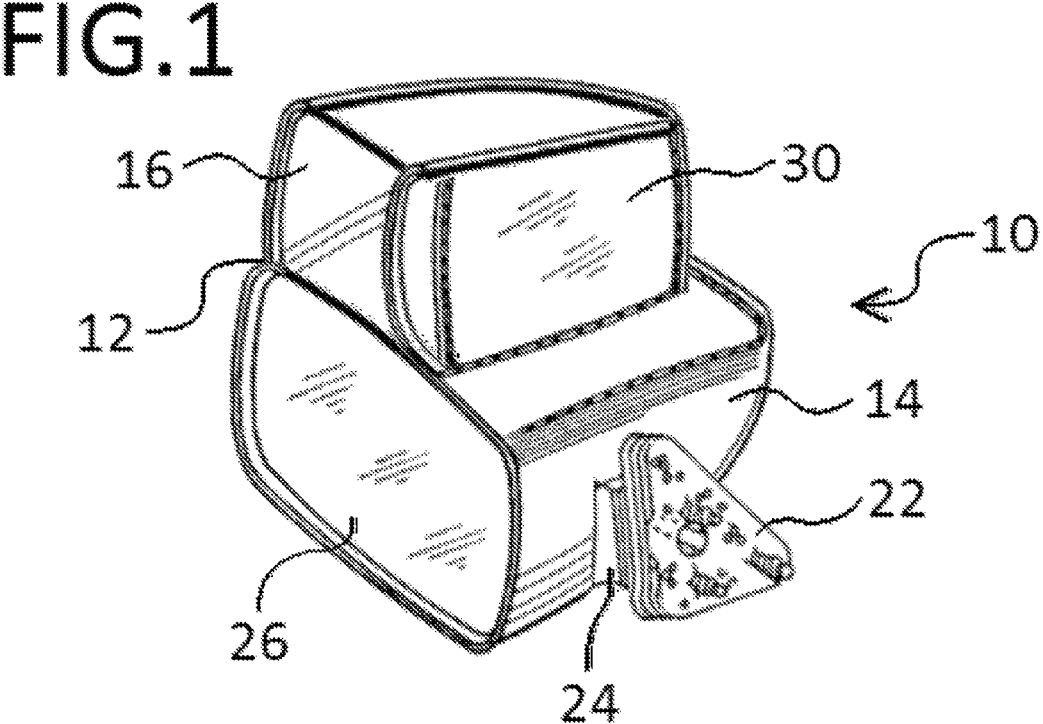

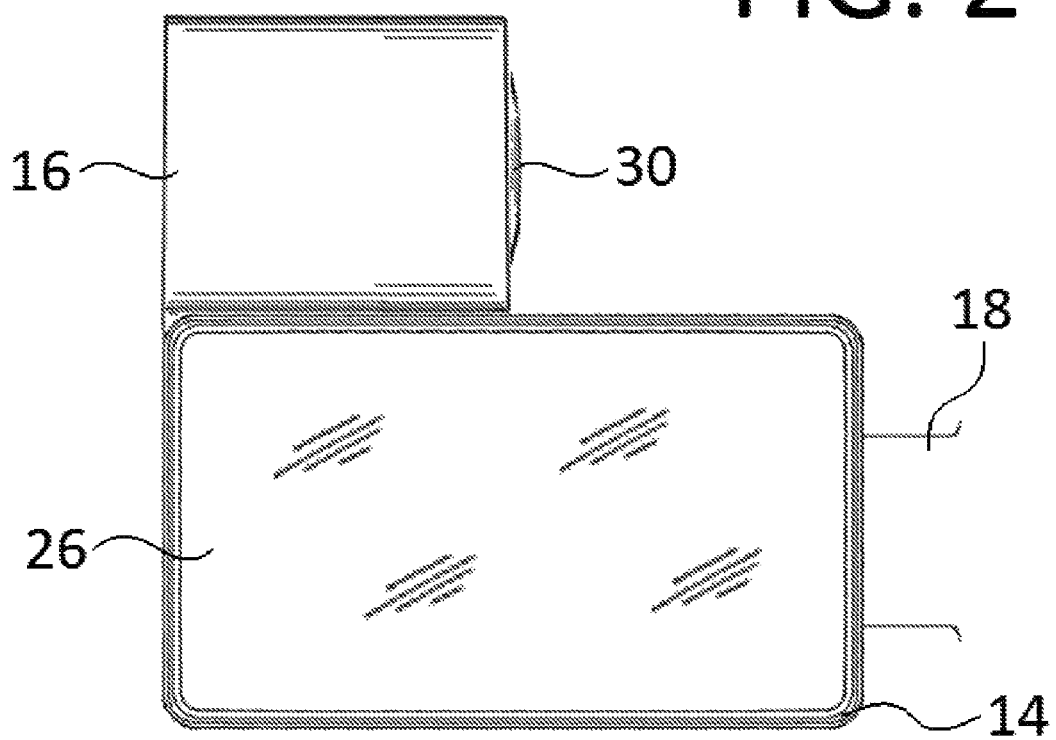

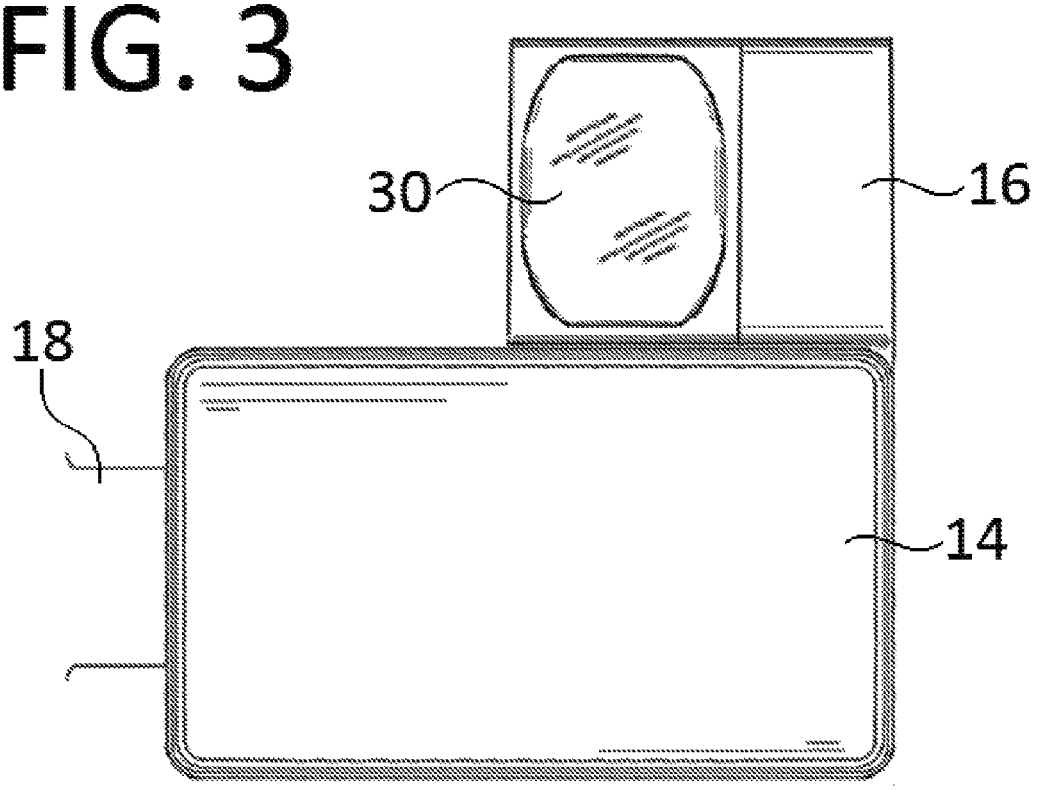

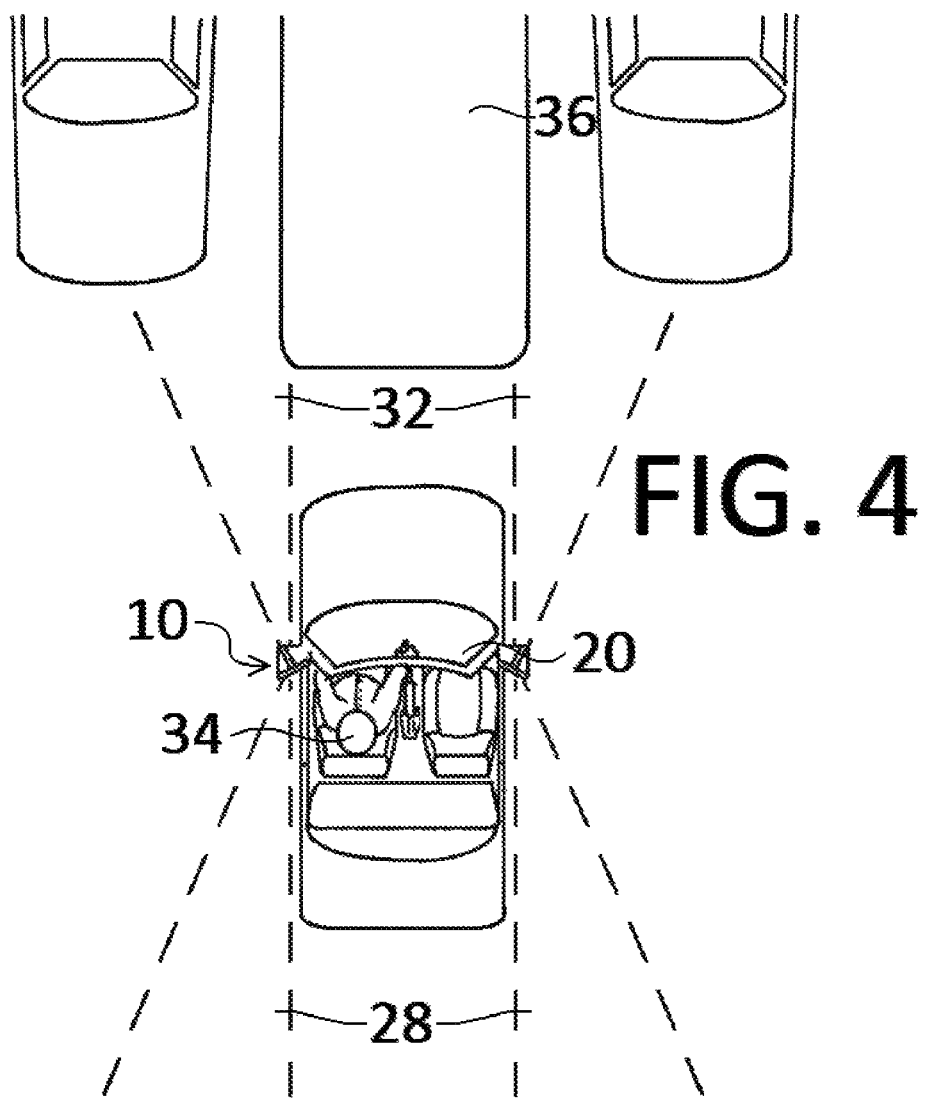

FORWARD AND REARWARD VIEWING MIRROR DEVICE

CROSS-REFERENCE TO RELATED APPLICATION

Not Applicable

FEDERALLY SPONSORED RESEARCH

Not Applicable

REFERENCE TO SEQUENCE LISTING

Not Applicable

FIELD OF THE INVENTION

The present invention relates to mirrors for vehicles and more particularly pertains to a new forward and rearward viewing mirror device for vehicles.

BACKGROUND OF THE INVENTION

Many automobile accidents are consequences of human error rather than mechanical failure. This is especially true with today's state-of-the-art automotive amenities which have virtually eliminated the possibility of accidents occurring as a result of technological malfunction. Still, the automotive industry continues to focus on improved safety features for motor vehicles by designing mechanisms to protect both drivers and passengers, making for safer driving conditions.

Vehicular accidents are commonly caused during the passing and overtaking of vehicles that are anterior to one's own vehicle. Safety hazards are created when large and/or wide vehicles block the visual field available to the vehicle in the posterior position, obstructing the view of the driver. It has heretofore been necessary to direct the vehicle slightly into the adjacent lane on the right or left in order to assure safe passage into another lane.

The ability to see other vehicles is an important aspect in accident prevention. Furthermore, having adequate views to the rear of, alongside, and/or forward of one's vehicle is essential to safe operation. These views are obtained in a less hazardous manner when the driver is not required to make dangerous movement into another lane in order to obtain a greater visual field prior to passing vehicles immediately ahead of them.

The use of vehicular mirrors is known in the prior art. More specifically, vehicular mirrors heretofore devised and utilized are known to consist basically of familiar, expected and obvious structural configurations, notwithstanding the myriad of designs encompassed by the crowded prior art which have been developed for the fulfillment of countless objectives and requirements. It may be desirable to provide a forward and rearward viewing mirror device which provides the visual field of significant areas and/or objects that would otherwise not be viewable to the driver and thus overcomes the various drawbacks of the prior art.

Many mechanisms have been proposed and constructed for enhancing the forward visual field available to drivers. These include image capture devices, periscope apparatuses, and the use of prisms or a system of mirrors. Although often providing results, these devices also have several shortcomings. For example and without limitation, image capturing devices are subject to obstruction, cloudiness, and malfunctions. This would require frequent repair or replacement as a result of structural degradation to the device. The periscope approach narrows the field of view that is produced and has limited mobility. The use of prisms creates a distorted view from the refraction, as opposed to reflection, and results in a view that is of poor quality for determining the traffic situation ahead of the vehicle. Lastly, the use of multiple mirrors in a mirror system creates the cumbersome duty of constant realignment of mirrors alongside susceptibility to misalignment.

The prior art displays many devices that produce front and rear images that appear side-by-side or stacked when viewed, and can cause confusion as to which direction is being reflected toward the driver. Other prior art produces results with openings built into the apparatus which can become blocked from various materials residing within and/or comprising the ambient environment that the vehicle resides, causing damage to the device and making it subject to both maintenance problems and breakage. The aforementioned conditions substantially prevent the prior art from properly operating and/or undesirably interfere with their operation.

In view of the foregoing disadvantages inherent in the known types of mirrors now present in the prior art, the present invention provides a new forward and rearward viewing mirror device wherein the same can be utilized for a more effective visual field while operating a vehicle. It is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

PRINCIPLE OBJECTS OF THE INVENTION

It is a first object of the present invention to provide a new forward and rearward viewing minor device for a vehicle which overcomes some or all of the previously delineated disadvantages of the prior art.

It is a second object of the present invention to provide a new forward and rearward viewing mirror device which improves the visual field by providing a driver with an efficacious view of objects forward, rearward, and/or alongside of the vehicle.

It is a third object of the present invention to provide a new forward and rearward viewing mirror device which gives the driver of a vehicle an improved line of sight with respect to objects ahead of the vehicle, while maintaining a view of objects to the rear of the vehicle, without requiring the driver to significantly direct the vehicle into an adjacent lane in order to view the traffic conditions that would otherwise be obstructed by preceding objects and/or vehicles.

It is another object of the present invention to provide a new forward and rearward viewing mirror device that can be attached to a vehicle for providing the driver thereof with an enhanced visual field.

Still another object of the present invention is to provide a new forward and rearward viewing minor device that is adjustable to various angles to enable usage for a wide variety of people.

Yet another object of the present invention is to provide a new forward and rearward viewing mirror device which permits relatively safe forward and rearward viewing while utilizing conventional and/or modern material and equipment to manufacture the apparatus.

BRIEF SUMMARY OF THE INVENTION

These, and other, objects are achieved by a forward and rearward viewing mirror device which in lieu of the preferred embodiment comprises a unit that can he attached to a vehicle; a first mirror for viewing objects rearward of the vehicle is positioned in the unit to provide the rearward view known to those skilled in the art, and a second mirror for viewing objects forward of the vehicle is positioned in the unit near sagittal relative to the first mirror and angled to provide a forward view. Each mirror is movable and capable of adjustment over a wide range therefore resulting in a plurality of angle positions.

The present invention utilizes mirrors to reflect an image in a way that preserves much of its original quality subsequent to its contact with the mirror. The positioning of the first mirror with respect to the second mirror provides a non-planar format of viewing for the driver; thus, creating a distinction in the viewing perspectives for the forward viewing mirror and for the rearward viewing mirror. Single mirror usage provides primary and direct reflected images. The ability to adjust the forward viewing mirror allows for the creation of angles that reduce the view of the obstacle and increase the visual field that is ahead of the driver, so that objects can be seen from a. considerable distance without the driver having to move the vehicle significantly into an adjacent lane. Also, the option to use side mirror engineering known to those skilled in the art enables past technology to be incorporated into the architecture whereby conventional and modern mirror assembly configuration can be improved upon to provide optimal results for an enhanced forward and rearward view during operation of a vehicle.

It may therefore be desirable to allow a user of a vehicle to view certain areas and/or objects which are located or disposed in the front and/or along the side of the vehicle, thereby allowing the user to gain additional images or information over that which is traditionally and/or typically provided by present-day mirrors. This additional information may be useful in the navigation and/or operation of the vehicle.

BRIEF DESCRIPTION OF THE DRAWING FIGURES

FIG. 1 is a schematic perspective view of a first embodiment of the forward and rearward viewing mirror device according to the present invention.

FIG. 2 is a schematic rear perspective view of the forward and rearward viewing mirror device.

FIG. 3 is a schematic front perspective view of the forward and rearward viewing mirror device.

FIG. 4 is a schematic plan view of the forward and rearward viewing mirror device mounted to a vehicle, illustrating a principle in accordance with the teaching of the present invention.

DESCRIPTION OF THE PREFERRED EMBODIMENT

The present invention can be employed on automobiles and vehicles other than automobiles, such as trucks and buses as well as for commercial, emergency, military, and government vehicles and industrial uses such as on construction equipment or warehouse moving equipment. Other objects, features and advantages of the invention will become apparent from a consideration of the following detailed description and the accompanying drawings.

With reference now to the drawings, and in particular to FIGS. 1 through 4 thereof, a new forward and rearward viewing mirror device embodying the principles and concepts of the present invention and generally designated by the reference numeral 10 will be described.

As best illustrated in FIGS. 1 through 4, the forward and rearward viewing mirror device 10 generally comprises a forward and rearward viewing mirror device for permitting a driver using the mirror device to see forward and rearward of the vehicle, extending and enhancing the available visual field.

The system comprises a unit 12 having a first chamber 14 and a second chamber 16. The first chamber 14 is located on a face of the unit 12. The first chamber 14 has an element therein to permit housing into the unit 12. The second chamber 16 is located near sagittal to the first chamber 14 of the unit 12. The second chamber 16 has an element therein to permit housing into the unit 12.

An arm 18 secures the unit 12 to a vehicle 20. The arm 18 has a first end 22 and a second end 24. The first end 22 of the arm 18 is adapted for mounting the unit 12 to a vehicle 20. The second end 24 of the arm 18 is coupled to the unit 12. The second end 24 of the arm 18 could be rotatably coupled to the unit 12.

A first mirror 26 views rearward 28 the vehicle 20. The first mirror 26 is rotatably mounted in the element of the first chamber 14.

A second mirror 30 views forward 32 the vehicle 20. The second mirror 30 is rotatably mounted in the element of the second chamber 16.

The first mirror 26 is adapted for displaying to the driver 34 the visual field rearward 28 of the vehicle 20. The second mirror 30 is adapted for displaying to the driver 34 the visual field forward 32 of the vehicle 20, also allowing the driver 34 to view around an obstruction 36 that is blocking the forward vision path, without having to significantly move the vehicle into an adjacent lane. The first mirror 26 and second mirror 30 are fully adjustable to provide the most effective visual field area.

The angle of the first mirror 26 and second mirror 30 as well as the positioning of the first chamber 14 and second chamber 16 of the unit 12 will be so that the combination of aesthetics and utility is optimum for each individual type, make, and/or model of vehicle. Furthermore, the forward and rearward visual field area can be extended and enhanced using conventional and/modern modern mechanisms (e.g. convex/concave mirrors and mechanical/electrical adjusting means) known to those skilled in the art. It is to be realized that the optimum dimensional relationships for the parts of the invention may include, but are not limited to, variations in size, materials, shape, form, function and manner of operation, assembly and use, all of which are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Furthermore, since numerous modifications and changes will readily occur to those skilled in the art, it is not desired to limit the invention to the exact construction and operation shown and described, and accordingly, all suitable modifications and equivalents may be resorted to, falling within the spirit and scope of the invention.

I claim:

1. A forward-view and rear-view mirror device for permitting a driver to see forward and rearward of a vehicle, the device comprising:
   A unit having a rear-view enclosing chamber housing a rearward-viewing minor;
   An arm for securing the unit to the vehicle, the arm having a first end and a second end, the first end of the arm being adapted for mounting to the vehicle, the second end of the arm being coupled to the unit;
   A forward-view enclosing chamber located above the rear-view enclosing chamber and housing a forward-viewing mirror, wherein a reflective face of the forward-viewing mirror substantially extends along a sagittal plane of the rear-view enclosing chamber;
   Wherein the forward-viewing mirror is adapted for directly reflecting to the driver a visual field forward of the vehicle, the visual field forward of the vehicle including areas that would otherwise be blocked by an obstruction in front of the vehicle.

\* \* \* \* \*